United States Patent [19]

Kaneko et al.

[11] Patent Number: 5,008,769
[45] Date of Patent: Apr. 16, 1991

[54] ROTARY HEAD TYPE MAGNETIC RECORDING/REPRODUCING DEVICE

[75] Inventors: Koji Kaneko; Yasuyuki Sugino, both of Higashi-Hiroshima, Japan

[73] Assignee: Sharp Kabushiki Kaisha, Osaka, Japan

[21] Appl. No.: 464,222

[22] Filed: Jan. 12, 1990

[30] Foreign Application Priority Data

Jan. 12, 1989 [JP] Japan .................................. 1-7028

[51] Int. Cl.⁵ .............................................. G11B 15/60
[52] U.S. Cl. .................................................. 360/130.24
[58] Field of Search ...................... 360/130.24, 107, 85

[56] References Cited

U.S. PATENT DOCUMENTS 4,959,743  9/1990  Koichi ........................... 360/130.24

FOREIGN PATENT DOCUMENTS

3545804-A1  3/1986  Denmark .

OTHER PUBLICATIONS

Patent Abstracts of Japan, vol. 10, No. 34, p. 427, Kokai No. 60-182041.
Patent Abstracts of Japan, vol. 9, No. 246, p. 393, Kokai No. 60-98556.
Patent Abstracts of Japan, vol. 11, No. 153, p. 577, Kokai No. 61-289518.

*Primary Examiner*—A. J. Heinz
*Attorney, Agent, or Firm*—David G. Conlin; Robert F. O'Connell

[57] ABSTRACT

A rotary head type magnetic recording/reproducing device includes a stationary drum, and a rotary drum disposed coaxially with the stationary drum and secured to the rotary shaft of the motor. The rotary drum has a cylindrical portion which is slightly greater in diameter than the stationary drum, a first truncated cone portion integrally connected to the cylindrical portion at a bottom thereof and decreasing in diameter in a direction toward the stationary drum at a first taper angle, and a second truncated cone portion integrally connected to a top surface of the first truncated cone portion at a bottom thereof and decreasing in diameter in the direction toward the stationary drum at a second taper angle which is greater than the first taper angle.

4 Claims, 3 Drawing Sheets

ROTARY HEAD TYPE MAGNETIC RECORDING/REPRODUCING DEVICE

BACKGROUND OF THE INVENTION

1. Field of the Invention

The present invention relates to a rotary head type magnetic recording/reproducing device, more especially relates to a rotary head type magnetic recording/reproducing device used in VTR (video tape recorder), DAT (digital audio tape recorder), a data recorder and a back-up streamer each having a rotary head.

2. Description of the Related Art

A rotary head type magnetic recording/reproducing device according to the related art comprises a lower stationary drum, a motor having a rotary shaft penetrating the stationary drum, and an upper rotary drum disposed coaxially with the stationary drum and secured to the rotary shaft of the motor.

An opening for accommodating a magnetic head is formed on an outer surface of the rotary drum at a position adjacent to the lower end of the rotary drum, thus the magnetic head is mounted within the opening. A stepped portion for guiding a magnetic tape is formed in an outer surface of the stationary drum.

In order to conduct the recording/reproducing by bringing the magnetic head into directly contact with the magnetic tape, the magnetic head radially projects over the outer surface of the rotary drum. The rotary drum is arranged to have the same outer diameter from the top end thereof to the lower end thereof, the rotary drum being greater in diameter than the stationary drum by a certain degree.

The magnetic tape is arranged to come into contact with both the rotary drum and the stepped portion formed in the stationary drum.

However, the above-described device encounters the following problems:

A contact pressure between the magnetic tape and the rotary drum is greater than a contact pressure between the magnetic tape and the stationary drum. The contact pressure between the magnetic tape and the rotary drum increases when it approaches the stationary drum.

The magnetic tape is bent in its widthwise direction since the contact pressure becomes maximal in a portion in which the magnetic tape comes contact with the magnetic head. Furthermore, a vacuum pressure is generated in a gap between the magnetic head and the opening, the vacuum pressure causing the magnetic tape to be sucked in the direction toward the center of the rotary drum. Accordingly, the magnetic tape is warped in its lengthwise direction, causing the magnetic powder to be separated from the magnetic tape. The separated magnetic powder can contaminate the surface of the magnetic head. As a result, the recording/reproducing performance of the device of this type deteriorates. Furthermore, the magnetic tape can be damaged during its contact with a corner portion of the rotary drum defining the opening. The magnetic tape loses its durability due to the damage.

SUMMARY OF THE INVENTION

It is therefore an object of the present invention to provide a rotary head type magnetic recording/reproducing device which ensures to prevent the magnetic tape from bending at an acute angle.

The object of the present invention can be achieved by a rotary head type magnetic recording/reproducing device comprising:

a stationary drum having at an outer surface thereof a stepped portion for guiding a magnetic tape;

a motor having a rotary shaft penetrating the stationary drum; and a rotary drum disposed coaxially with the stationary drum and secured to the rotary shaft, the rotary drum comprising a cylindrical portion which is slightly greater in diameter than the stationary drum, a first truncated cone portion integrally connected to the cylindrical portion at a bottom thereof and decreasing in diameter in a direction toward the stationary drum at a first taper angle, and a second truncated cone portion integrally connected to a top surface of the first truncated cone portion at a bottom thereof and decreasing in diameter in the direction toward the stationary drum at a second taper angle which is greater than the first taper angle, the rotary drum having an opening at a portion adjacent to a top end of the second truncated cone portion, the opening accommodating a magnetic head.

Advantages of the above-mentioned device are described hereinafter.

Since the rotary drum has the first truncated cone portion having a first taper angle and the second truncated cone portion having a second taper angle, air can be introduced between the outer surface of the first truncated cone portion and the magnetic tape so that an air layer is created (Air-film effect). As a result, the contact pressure generated between the outer surface of the first truncated cone portion and the magnetic tape can be made smaller than the contact pressure generated in the device shown in FIG. 1.

The air film effect can prevent the magnetic tape from bending at an acute angle in the widthwise direction of the magnetic tape at a portion corresponding to a leading end of the magnetic head. Therefore, the separation of the magnetic powder from the magnetic tape due to the bending of the magnetic tape can be prevented. Therefore, the surface of the magnetic head cannot be contaminated by the magnetic powder so that the magnetic head can record and reproduce data to and from the magnetic tape.

The rotary drum creates a vacuum pressure in the opening because the rotary drum rotates at high speed. Therefore, the magnetic tape is sucked in the direction toward the center of the rotary drum. However, since the distance from the circumferential portion of the top surface of the second truncated cone portion having the second taper angle to the top end of the magnetic head is arranged to be a larger value, the magnetic tape cannot come into directly contact with a corner portion of the rotary drum which defines the opening. Therefore, the base material of the magnetic tape can be protected from damages so that the durability of the magnetic tape can be retained.

Further objects and advantages of the present invention will be apparent from the following description, reference being had to the accompanying drawings wherein preferred embodiments of the present invention are clearly shown.

DESCRIPTION OF THE PREFERRED EMBODIMENT

Figure 1:
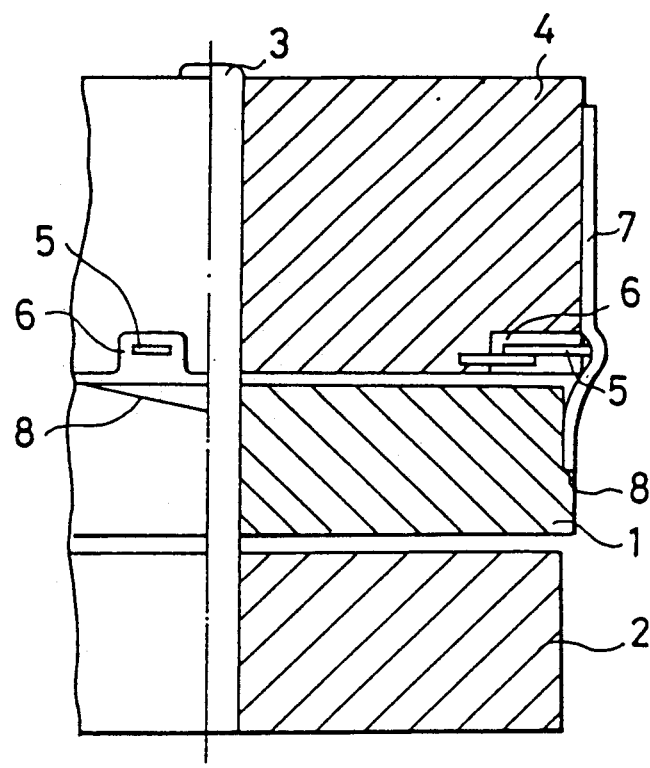
FIG. 1 is a semi diagrammatical vertical sectioned view of the device according to the related art.
Figure 2:
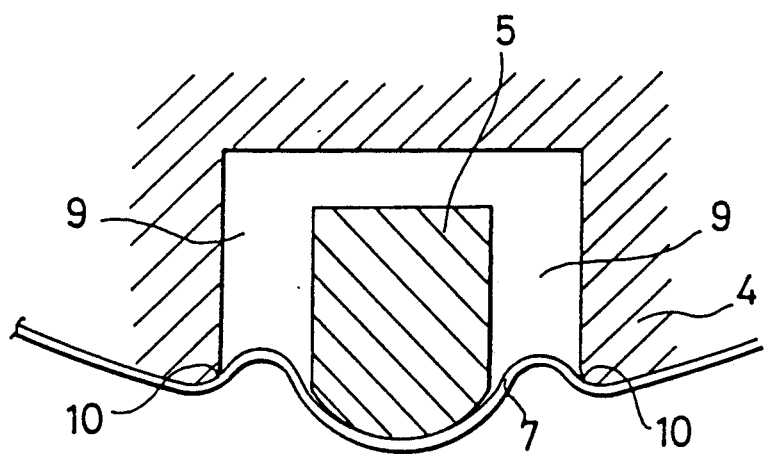
FIG. 2 is a partially horizontal sectional view of the device according to the related art.
Figure 3:
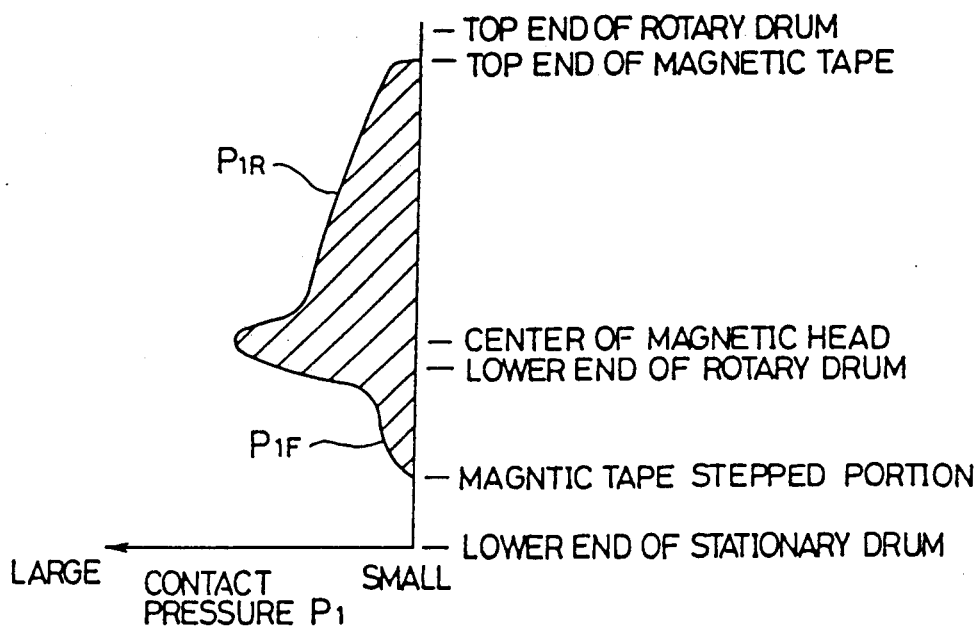
FIG. 3 is a graph illustrating the distribution of the contact pressure between the magnetic tape and each of the stationary drum, the rotary drum and the magnetic head according to the related art.

Related art relating to the present invention will be described hereinafter with reference to FIGS. 1 to 3.

A rotary head type magnetic recording/reproducing device comprises a lower stationary drum 1, a motor 2 having a rotary shaft 3 penetrating the stationary drum 1, and an upper rotary drum 4 disposed coaxially with the stationary drum and secured to the rotary shaft 3 of the motor 2.

An opening 6 for accommodating a magnetic head 5 is formed on an outer surface of the rotary drum 4 at a position adjacent to the lower end of the rotary drum 4, thus the magnetic head 5 is mounted within the opening 6. A spiral cut portion 8 for guiding a magnetic tape 7 is formed in an outer surface of the stationary drum 1.

In order to conduct the recording/reproducing by bringing the magnetic head 5 into directly contact with the magnetic tape 7, the magnetic head 5 radially projects over the outer surface of the rotary drum 4. The rotary drum 4 is arranged to have the same outer diameter from the top end thereof to the lower end thereof. The rotary drum 4 is greater in diameter than the stationary drum 1 by a certain degree in order to prevent the magnetic tape 7 from biasing toward the stationary drum 1.

The magnetic tape 7 is arranged to come into contact with both the rotary drum 4 and the cut portion 8 formed in the stationary drum 1.

However, the above-described apparatus encounters the following problems:

A contact pressure $P_{1R}$ between the magnetic tape 7 and the rotary drum 4 is larger than a contact pressure $P_{1F}$ between the magnetic tape 7 and the stationary drum 1. The contact pressure $P_{1R}$ between the magnetic tape 7 and the rotary drum 4 increases when it approaches the stationary drum 1.

The magnetic tape 7 is bent in its widthwise direction since the contact pressure $P_{1R}$ becomes maximal in a portion in which the magnetic tape 7 comes contact with the magnetic head 5. Furthermore, a vacuum pressure is generated in a gap 9 between the magnetic head 5 and the opening 6, the vacuum pressure causing the magnetic tape 7 to be sucked in the direction toward the center of the rotary drum 4. Accordingly, the magnetic tape 7 is warped in its lengthwise direction, causing the magnetic powder to be separated from the magnetic tape 7. The separated magnetic powder can contaminate the surface of the magnetic head 5. As a result, the recording/reproducing performance of the device of this type deteriorates. Furthermore, the magnetic tape 7 can be damaged during its contact with a corner portion 10 of the rotary drum 4 defining the opening 6. The magnetic tape 7 loses its durability due to the damage.

Figure 4:
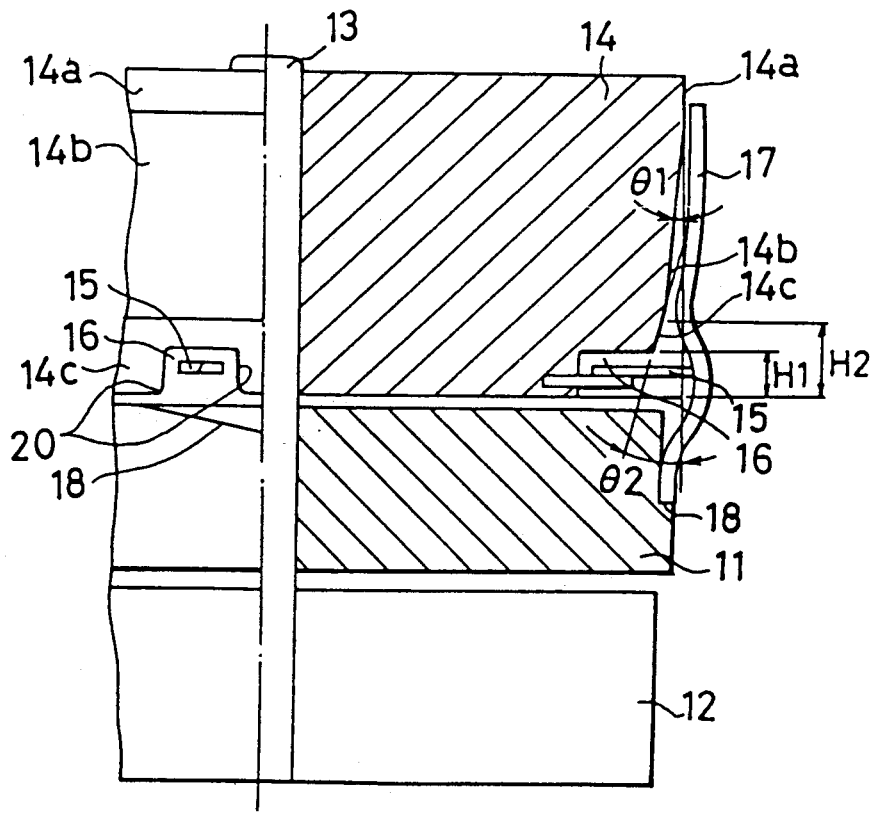
FIG. 4 is a semi diagrammatical vertical sectional view of the device according to the present invention.
Figure 5:
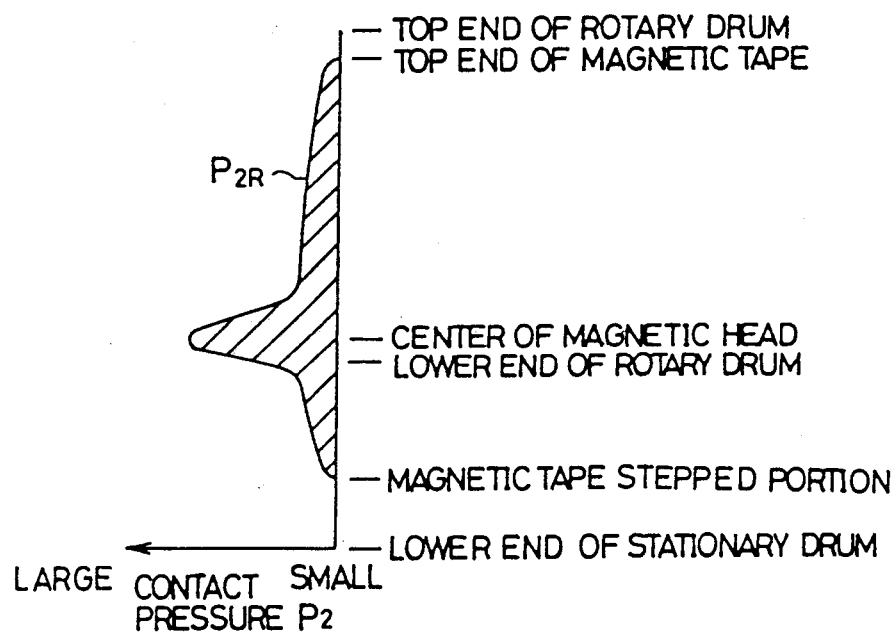
FIG. 5 is a graph illustrating the distribution of the contact pressure between the magnetic tape and each of the stationary drum, the rotary drum and the magnetic head according to the present invention.

An embodiment of the present invention will be described hereinafter in detail with reference to FIGS. 4 and 5.

A rotary head type magnetic recording/reproducing device according to this embodiment of the present invention comprises a lower stationary drum 11, a motor 12 having a rotary shaft 13 penetrating the stationary drum 11, and an upper rotary drum 14 disposed coaxially with the stationary drum 11 and secured to the rotary shaft 13 of the motor 12.

The rotary drum 14 comprises: a cylindrical portion 14a which is slightly greater in diameter than the stationary drum 11; a truncated cone portion 14b integrally connected to the cylindrical portion 14a at a bottom thereof and decreasing in diameter in the direction toward the stationary drum 11 at a taper angle of $\theta 1$; and a truncated cone portion 14c integrally connected to the top surface of the truncated cone portion 14b at a bottom thereof and decreasing in diameter in the direction toward the rotary drum 11 at a taper angle of $\theta 2$, which is greater than the taper angle of $\theta 1$.

An opening 16 for accommodating a magnetic head 15 is formed in a portion adjacent to a top end of the truncated cone portion 14c. The magnetic head 15 is mounted within the opening 16.

A height H2 of truncated cone portion 14c is greater than a length H1 of the opening 16 with respect to a longitudinal direction of the rotary shaft 13. A stepped portion 18 for guiding the magnetic tape 17 is formed in the outer surface of the stationary drum 11. The magnetic tape 17 comes into contact with both the rotary drum 14 and the cut portion 18 formed in the stationary drum 11. The magnetic head 15 radially project over the outermost portion of the rotary drum 14. The recording/reproducing can be conducted by bringing the magnetic head 15 into directly contact with the magnetic tape 17. The stationary drum 11 is 29.9 mm in diameter, 6.5 mm in height. The rotary drum 14 is 30.0 mm in maximum outer diameter, 4.3 mm, in height, 2000 rpm in rotational speed. The taper angle $\theta 1$ of the truncated cone portion 14b is 0.02, to 0.08 degree, preferably 0.05 degree. The taper angle $\theta 2$ of the truncated cone portion 14c is 0.1 to 0.5 degree, preferably 0.25 degree. The height H2 of the truncated cone portion 14c is 1.1 to 1.4 mm, preferably 1.25 mm. The running speed of the magnetic tape 17 is 8.15 mm/s.

The operation of the embodiment according to the present invention will be described hereinafter.

The magnetic tape 17 is moved forwards by proper tape-running means with coming into contact with the rotary drum 14, the magnetic head 15, and the stationary drum 11. The information recorded surface of the magnetic tape 17 first comes into contact with the bottom of the stepped portion 18, and the edge of the magnetic tape 17 comes into contact with the side wall of the stepped portion 18. As a result, the stepped portion 18 guides the running magnetic tape 17.

The magnetic tape 17 moves diagonally with respect to the central rotation axis of the rotary drum 14 as a result of the guide performed by the cut portion 18. The rotary drum 14 rotates in such a manner that the moving direction of its outer surface coming contact with the magnetic tape 17 is the same moving direction as the magnetic tape 17.

When the magnetic tape 17, the rotary drum 14, and the magnetic head 15 are operated as described above, a contact pressure $P_2$ is generated between the magnetic tape 17 and each of the stationary drum 11, the magnetic head 15, and the rotary drum 14. The contact pressure $P_{2R}$ between the magnetic tape 17 and the rotary drum 14 increases in approaching in the direction toward the rotary drum 11, and the contact pressure $P_{2R}$ becomes maximal in a portion in which the magnetic tape 17 comes contact with the magnetic head 15.

However, since the rotary drum 14 according to this embodiment has the truncated cone portion 14b having a taper angle of $\theta 1$ and the truncated cone portion 14c having a taper angle of $\theta 2$, air can be introduced between the outer surface of the truncated cone portion 14a and the magnetic tape 17 so that an air layer is created (Air-film effect). As a result, the contact pressure $P_{2R}$ generated between the outer surface of the truncated cone portion 14b and the magnetic tape 17 can be made smaller than the contact pressure $P_{1R}$ generated in the apparatus shown in FIG. 1.

The air film effect can prevent the magnetic tape 17 from bending at an acute angle in the widthwise direction of the magnetic tape 17 at a portion corresponding to a leading end of the magnetic head 15. Therefore, the separation of the magnetic powder from the magnetic tape 17 due to the bending of the magnetic tape 17 can be prevented. Therefore, the surface of the magnetic head 15 cannot be contaminated by the magnetic powder so that the magnetic head 15 can record and reproduce data to and from the magnetic tape 17.

The rotary drum 14 creates a vacuum pressure in the opening 16 because the rotary drum 14 rotates at high speed. Therefore, the magnetic tape 17 is sucked in the direction toward the center of the rotary drum 14. However, since the distance from the circumferential portion of the top surface of the truncated cone portion 14c having taper angle of $\theta 2$ to the top end of the magnetic head 15 is arranged to be a larger value, the magnetic tape 17 cannot come into directly contact with a corner portion 20 of the rotary drum 14 which defines the opening 16. Therefore, the base material of the magnetic tape 17 can be protected from damages so that the durability of the magnetic tape 17 can be retained.

A recording/reproducing characteristics of the magnetic tape 17 due to the embodiment of the present invention will be described hereinafter in detail with reference to FIG. 6.

Figure 6:
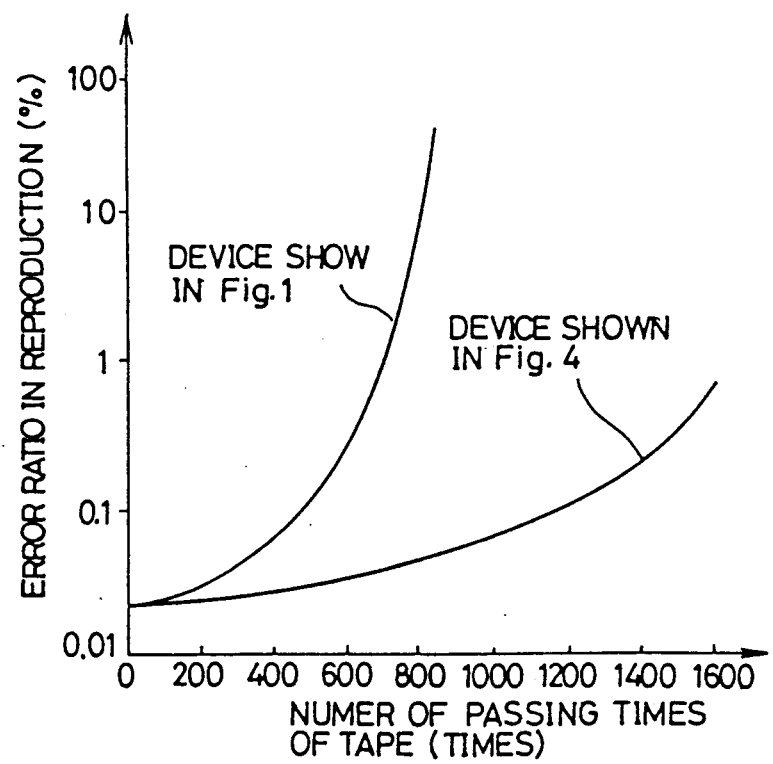
FIG. 6 is a diagram illustrating the error ratio in reproducing of a magnetic recording data with respect to the tape passing number to help compare the device of the related art with the device of the present invention.

The device according to the embodiment of the present invention, as shown in FIG. 6, improves an error ratio in reproducing of a magnetic recording data with respect to "tape passing number" comparing with the device of the related art, where "tape passing number" designates the number by which the predetermined portion of the magnetic tape 17 is reproduced repeatedly.

Further, the electric power of the motor 12 and a wow flutter decreases due to the decrease of the contact pressure of the magnetic tape 17.

Many widely different embodiments of the present invention may be constructed without departing from the spirit and scope of the present invention. It should be understood that the present invention is not limited to the specific embodiments described in this specification, except as defined in the appended claims.

What is claimed is:

1. A rotary head type magnetic recording/reproducing device comprising:
   a stationary drum having at an outer surface thereof a spiral cut portion for guiding a magnetic tape;
   a motor having a rotary shaft penetrating said stationary drum; and
   a rotary drum disposed coaxially with said stationary drum and secured to said rotary shaft, said rotary drum comprising a cylindrical portion which is slightly greater in diameter than said stationary drum, a first truncated cone portion integrally connected to said cylindrical portion at a bottom thereof and decreasing in diameter in a direction toward said stationary drum at a first taper angle, and a second truncated cone portion integrally connected to a top surface of said first truncated cone portion at a bottom thereof and decreasing in diameter in said direction toward said stationary drum at a second taper angle which is greater than said first taper angle, said rotary drum having an opening at a portion adjacent to a top end of said second truncated cone portion, said opening accommodating a magnetic head.

2. A rotary head type magnetic recording/reproducing device according to claim 1, wherein a height of said second truncated cone portion is greater than a length of said opening with respect to a longitudinal direction of said rotary shaft.

3. A rotary head type magnetic recording/reproducing device according to claim 2, wherein said height of said second truncated cone portion is 1.1 to 1.4 mm, said first taper angle is 0.02 to 0.08 degree, and said second taper angle is 0.1 to 0.5 degree.

4. A rotary head type magnetic recording/reproducing device according to claim 3, wherein said height of said second truncated cone portion is 1.25 mm, said first taper angle is 0.05 degree, and said second taper angle is 0.25 degree.

* * * * *